United States Patent

Russo et al.

(10) Patent No.: US 11,200,407 B2
(45) Date of Patent: Dec. 14, 2021

(54) SMART BADGE, AND METHOD, SYSTEM AND COMPUTER PROGRAM PRODUCT FOR BADGE DETECTION AND COMPLIANCE

(71) Applicant: MOTOROLA SOLUTIONS, INC., Chicago, IL (US)

(72) Inventors: Pietro Russo, Melrose, MA (US); Azamat Sarkytbayev, San Jose, CA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 267 days.

(21) Appl. No.: 16/700,414

(22) Filed: Dec. 2, 2019

(65) Prior Publication Data

US 2021/0166002 A1 Jun. 3, 2021

(51) Int. Cl.
*G06K 9/00* (2006.01)
*H04N 7/18* (2006.01)
*G08B 13/196* (2006.01)

(52) U.S. Cl.
CPC ..... *G06K 9/00288* (2013.01); *G06K 9/00255* (2013.01); *G06K 9/00268* (2013.01); *G06K 9/00771* (2013.01); *G08B 13/19608* (2013.01); *H04N 7/181* (2013.01); *G06K 2009/00322* (2013.01)

(58) Field of Classification Search
CPC .......... G06K 9/00288; G06K 9/00255; G06K 9/00268; G06K 9/00771; G06K 2009/00322; G06K 2009/00328; G08B 13/19608; G08B 13/196; H04N 7/181;
(Continued)

(56) References Cited

U.S. PATENT DOCUMENTS 4,821,118 A * 4/1989 Lafreniere ....... G06Q 20/40145
348/156
6,575,902 B1 * 6/2003 Burton ...................... B60T 7/12
600/300

(Continued)

OTHER PUBLICATIONS

Romberg, Stefan, et al.: "Scalable Logo Recognition in Real-World Images", Proceedings of ACM International Conference on Multimedia Retrieval 2011, ACM, 2011, DOI: 10.1145/1991996. 1992021, all pages.

(Continued)

*Primary Examiner* — Mahendra R Patel

(57) ABSTRACT

A smart badge, and a method, system and computer program product for badge detection and compliance are disclosed. The method, carried out within a security system, includes capturing, using a camera, an image of a person. The captured image includes a face of the person within a first pixel region of the image. The method also includes performing facial recognition on the first pixel region to determine an identity of the person. The method also includes performing video analytics, on a second pixel region of the image, different than the first pixel region, to make a first determination that the identified person is wearing a badge, or to make a second determination that no badge is being properly worn by the identified person. The method also includes generating an alert, specific to the identified person, within the security system based at least in part on the first or second determination.

20 Claims, 6 Drawing Sheets

(58) Field of Classification Search
CPC ..... H04N 7/183; B25J 11/001; B25J 11/0015; B25J 11/008; B25J 9/0003; B25J 9/0006
USPC ............................................. 382/118
See application file for complete search history.

(56) References Cited

U.S. PATENT DOCUMENTS

| | | | | |
|---|---|---|---|---|
| 6,647,142 | B1* | 11/2003 | Beardsley | G06K 7/12 |
| | | | | 235/381 |
| 7,724,207 | B2* | 5/2010 | Mooney | G07C 9/22 |
| | | | | 345/2.3 |
| 8,938,257 | B2* | 1/2015 | Chao | G01S 5/16 |
| | | | | 455/456.1 |
| 9,886,633 | B2* | 2/2018 | Lin | G06K 9/00751 |
| 10,186,124 | B1* | 1/2019 | Mullins | G08B 13/19615 |
| 11,145,016 | B1* | 10/2021 | Brophy | G08B 25/001 |
| 11,153,492 | B2* | 10/2021 | Hutsler | G06K 9/00711 |
| 2007/0252001 | A1* | 11/2007 | Kail | G07C 9/33 |
| | | | | 235/380 |
| 2011/0152726 | A1* | 6/2011 | Cuddihy | G06K 9/00348 |
| | | | | 600/595 |
| 2015/0264296 | A1* | 9/2015 | Devaux | H04N 9/8205 |
| | | | | 386/226 |
| 2015/0332457 | A1* | 11/2015 | Mestha | G06T 7/0016 |
| | | | | 382/103 |
| 2016/0042621 | A1* | 2/2016 | Hogg | G08B 13/19615 |
| | | | | 348/155 |
| 2016/0293218 | A1* | 10/2016 | Hanis | G06K 7/10297 |
| 2018/0330815 | A1* | 11/2018 | Demir | G16H 40/20 |
| 2019/0108404 | A1* | 4/2019 | Xu | G06F 16/5838 |
| 2019/0147676 | A1* | 5/2019 | Madzhunkov | H04N 5/232 |
| | | | | 340/5.2 |
| 2019/0228532 | A1* | 7/2019 | Smilansky | G06T 1/0007 |
| 2019/0311187 | A1* | 10/2019 | Gleim | G06K 9/00288 |
| 2019/0318171 | A1* | 10/2019 | Wang | G06K 9/34 |
| 2019/0347913 | A1* | 11/2019 | Heemstra | B60R 25/30 |
| 2020/0057885 | A1* | 2/2020 | Rao | G06K 9/00771 |
| 2020/0134148 | A1* | 4/2020 | Mortazavian | G06T 7/70 |

OTHER PUBLICATIONS

Psyllos, Apostolos, et al.: "Vehicle Logo Recognition Using a SIFT-Based Enhanced Matching Scheme", IEEE Transactions on Intelligent Transportation Systems, vol. 11, No. 2, Jun. 2010, pp. 322-328.

Decawave, Zigpos Badge, https://www.decawave.com/zigpos/ https://www.decawave.com/zigpos/, downloaded from the internet: Jan. 15, 2020, all pages.

Qixiang Ye: "Text Detection and Recognition in Image: A Survey", IEEE Transactions on Pattern Analysis and Machine Intelligence • Jun. 2015, all pages.

Zhang Y., Zhu M., Wang D., Feng S. (2014) Logo Detection and Recognition Based on Classification. In: Li F., Li G., Hwang S., Yao B., Zhang Z. (eds) Web-Age Information Management. WAIM 2014. Lecture Notes in Computer Science, vol. 8485. Springer, Cham, all pages.

* cited by examiner

SMART BADGE, AND METHOD, SYSTEM AND COMPUTER PROGRAM PRODUCT FOR BADGE DETECTION AND COMPLIANCE

BACKGROUND

Badges and IDs are frequently issued as a form of visible identification. However, badges and IDs can typically be forged or copied without great difficulty, which can result in security risk. Also, some companies or entities may require strict policy enforcement in regards to a badge being worn and visible at all times.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
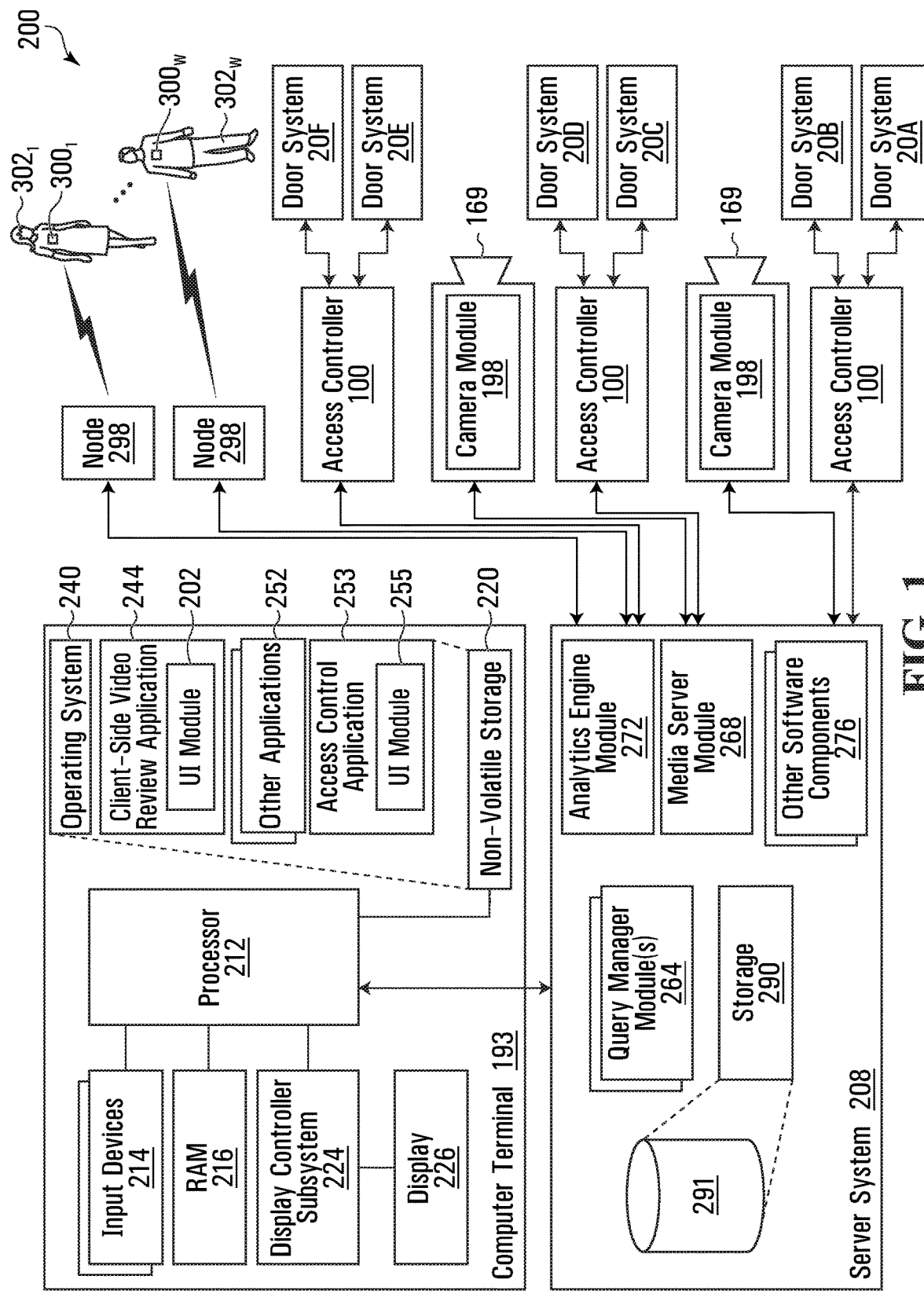
FIG. 1 is a block diagram of an example security system within which methods in accordance with example embodiments can be carried out.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

According to one example embodiment, there is provided a method carried out within a security system. The method includes capturing, using a camera, an image of a person. The captured image includes a face of the person within a first pixel region of the image. The method also includes performing facial recognition on the first pixel region to determine an identity of the person. The method also includes performing video analytics, on a second pixel region of the image, different than the first pixel region, to make a first determination that the identified person is wearing a badge, or to make a second determination that no badge is being properly worn by the identified person. The method also includes generating an alert, specific to the identified person, within the security system based at least in part on the first or second determination.

According to another example embodiment, there is provided a security system that includes a camera configured to capture an image of a person. The captured image includes a face of the person within a first pixel region of the image. The security system also includes at least one tangible, non-transitory, computer-readable storage medium having instructions encoded therein, wherein the instructions, when executed by at least one processor, cause a carrying out of a method that includes: i) performing facial recognition on the first pixel region to determine an identity of the person; ii) performing video analytics, on a second pixel region of the image, different than the first pixel region, to: make a first determination that the identified person is wearing a badge, or make a second determination that no badge is being properly worn by the identified person; and iii) generating an alert, specific to the identified person, within the security system based at least in part on the first or second determination.

Each of the above-mentioned embodiments will be discussed in more detail below, starting with example system and device architectures of the system in which the embodiments may be practiced, followed by an illustration of processing blocks for achieving an improved technical method, device, and system for badge detection and compliance. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Reference is now made to FIG. 1 which shows a block diagram of an example system (comprehensive security system 200) within which methods in accordance with example embodiments can be carried out. Included within the illustrated comprehensive security system 200 (and in which access control may be integrated with video viewing/recording) are one or more computer terminals 193 and a server system 208. In some example embodiments, the computer terminal 193 is a personal computer system; however in other example embodiments the computer terminal 193 is a selected one or more of the following: a handheld device such as, for example, a tablet, a phablet, a smart phone or a personal digital assistant (PDA); a laptop computer a smart television; and other suitable devices. With respect to the server system 208, this could comprise a single physical machine or multiple physical machines. It will be understood that the server system 208 need not be contained within a single chassis, nor necessarily will there be a single location for the server system 208. As will be appreciated by those skilled in the art, at least some of the functionality of the server system 208 can be implemented within the computer terminal 193 rather than within the server system 208.

The computer terminal 193 communicates with the server system 208 through one or more networks. These networks can include the Internet, or one or more other public/private networks coupled together by network switches or other communication elements. The network(s) could be of the form of, for example, client-server networks, peer-to-peer networks, etc. Data connections between the computer terminal 193 and the server system 208 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 193 and the server system 208 are within the same Local Area Network (LAN).

The computer terminal 193 includes at least one processor 212 that controls the overall operation of the computer terminal. The processor 212 interacts with various subsystems such as, for example, input devices 214 (such as a selected one or more of a keyboard, mouse, touch pad, roller ball and voice control means, for example), random access memory (RAM) 216, non-volatile storage 220, display controller subsystem 224 and other subsystems [not shown]. The display controller subsystem 224 interacts with display 226 and it renders graphics and/or text upon the display 226.

Still with reference to the computer terminal 193 of the comprehensive security system 200, operating system 240 and various software applications used by the processor 212 are stored in the non-volatile storage 220. The non-volatile storage 220 is, for example, one or more hard disks, solid state drives, or some other suitable form of computer readable medium that retains recorded information after the computer terminal 193 is turned off. Regarding the operating system 240, this includes software that manages computer hardware and software resources of the computer terminal 193 and provides common services for computer programs. Also, those skilled in the art will appreciate that the operating system 240, client-side video review application 244, the access control management application 253, and other applications 252, or parts thereof, may be temporarily loaded into a volatile store such as the RAM 216. The processor 212, in addition to its operating system functions, can enable execution of the various software applications on the computer terminal 193.

Still with reference to FIG. 1, the video review application 244 can be run on the computer terminal 193 and includes a UI module 202 for cooperation with a search session manager module of the application in order to enable a computer terminal user to carry out actions related to providing input facilitating the carrying out of Video Management System (VMS)-related functions. In such circumstances, the user of the computer terminal 193 is provided with a user interface generated on the display 226 through which the user inputs and receives information in relation to live video and/or video recordings.

As mentioned, the video review application 244 also includes the search session manager module, which provides a communications interface between the UI module 202 and a query manager module (i.e. a respective one of the one or more query manager modules 264) of the server system 208. In at least some examples, a search session manager module of the application 244 communicates with a respective one of the respective query manager module(s) 264 through the use of Remote Procedure Calls (RPCs).

Besides the query manager module(s) 264, the server system 208 includes several software components for carrying out other functions of the server system 208. For example, the server system 208 includes a media server module 268. The media server module 268 handles client requests related to storage and retrieval of video taken by video cameras 169 in the comprehensive security system 200. The server system 208 also includes an analytics engine module 272. The analytics engine module 272 can, in some examples, be any suitable one of known commercially available software that carry out mathematical calculations (and other operations) as understood by skilled persons to enable video analytics provided within the comprehensive security system 200 including, for example, facial recognition, appearance search, etc.

The server system 208 also includes a number of other software components 276. These other software components will vary depending on the requirements of the server system 208 within the overall system. As just one example, the other software components 276 might include special test and debugging software, or software to facilitate version updating of modules within the server system 208. The server system 208 also includes one or more data stores 290. In some examples, the data store 290 comprises one or more databases 291 which facilitate the organized storing of recorded video.

Regarding the video cameras 169, each of these includes a camera module 198. In some examples, the camera module 198 includes one or more specialized integrated circuit chips to facilitate processing and encoding of video before it is even received by the server system 208. For instance, the specialized integrated circuit chip may be a System-on-Chip (SoC) solution including both an encoder and a Central Processing Unit (CPU) and/or Vision Processing Unit (VPU). These permit the camera module 198 to carry out the processing and encoding functions. Also, in some examples, part of the processing functions of the camera module 198 includes creating metadata for recorded video. For instance, metadata may be generated relating to one or more foreground areas that the camera module 198 has detected, and the metadata may define the location and reference coordinates of the foreground visual object within the image frame. For example, the location metadata may be further used to generate a bounding box, typically rectangular in shape, outlining the detected foreground visual object (for example, whole body or face of a person). The image within the bounding box may be extracted for inclusion in metadata. The extracted image may alternately be smaller then what was in the bounding box or may be larger then what was in the bounding box. The size of the image being extracted can also be close to, but outside of, the actual boundaries of a detected object.

In some examples, the camera module 198 includes a number of submodules for video analytics such as, for instance, an object detection submodule, an instantaneous object classification submodule, a temporal object classification submodule and an object tracking submodule. Regarding the object detection submodule, such a submodule can be provided for detecting objects appearing in the field of view of the camera 169. The object detection submodule may employ any of various object detection methods understood by those skilled in the art such as, for example, motion detection and/or blob detection.

Regarding the object tracking submodule that may form part of the camera module 198, this may be operatively coupled to both the object detection submodule and the temporal object classification submodule. The object tracking submodule may be included for the purpose of temporally associating instances of an object detected by the object detection submodule. The object tracking submodule may also generate metadata corresponding to visual objects it tracks.

Regarding the instantaneous object classification submodule that may form part of the camera module 198, this may be operatively coupled to the object detection submodule and employed to determine a visual objects type (such as, for example, human, vehicle, animal, etc.) based upon a single instance of the object. The input to the instantaneous object classification submodule may optionally be a sub-region of an image in which the visual object of interest is located rather than the entire image frame.

Regarding the temporal object classification submodule that may form part of the camera module 198, this may be operatively coupled to the instantaneous object classification submodule and employed to maintain class information of an object over a period of time. The temporal object classification submodule may average the instantaneous class information of an object provided by the instantaneous classification submodule over a period of time during the lifetime of the object. In other words, the temporal object classification submodule may determine a type of an object based on its appearance in multiple frames. For example, gait analysis of the way a person walks can be useful to classify a person, or analysis of the legs of a person can be useful to classify a cyclist. The temporal object classification submodule may combine information regarding the trajectory of an object (e.g. whether the trajectory is smooth or chaotic, whether the object is moving or motionless) and confidence of the classifications made by the instantaneous object classification submodule averaged over multiple frames. For example, determined classification confidence values may be adjusted based on the smoothness of trajectory of the object. The temporal object classification submodule may assign an object to an unknown class until the visual object is classified by the instantaneous object classification submodule subsequent to a sufficient number of times and a predetermined number of statistics having been gathered. In classifying an object, the temporal object classification submodule may also take into account how long the object has been in the field of view. The temporal object classification submodule may make a final determination about the class of an object based on the information described above. The temporal object classification submodule may also use a hysteresis approach for changing the class of an object. More specifically, a threshold may be set for transitioning the classification of an object from unknown to a definite class, and that threshold may be larger than a threshold for the opposite transition (for example, from a human to unknown). The temporal object classification submodule may aggregate the classifications made by the instantaneous object classification submodule.

Referring still to FIG. 1, the camera module 198 is, in some examples, able to detect humans and extract images of humans with respective bounding boxes outlining the objects (for instance, full bodies and/or faces) for inclusion in metadata which, along with the associated video, may transmitted to the server system 208. At the system 208, the media server module 268 can process extracted images and generate signatures (e.g. feature vectors) to represent objects. In computer vision, a feature descriptor is generally known as an algorithm that takes an image and outputs feature descriptions or feature vectors. Feature descriptors encode information, i.e. an image, into a series of numbers to act as a numerical "fingerprint" that can be used to differentiate one feature from another. Ideally this information is invariant under image transformation so that the features may be found again in another image of the same object. Examples of feature descriptor algorithms are SIFT (Scale-invariant feature transform), HOG (histogram of oriented gradients), and SURF (Speeded Up Robust Features).

In accordance with at least some examples, a feature vector is an n-dimensional vector of numerical features (numbers) that represent an image of an object processable by computers. By comparing the feature vector of a first image of one object with the feature vector of a second image, a computer implementable process may determine whether the first image and the second image are images of the same object.

To further understand the above, take the example where the object is a face. Initially at face identification, the coordinates of a boundary box that bounds the face (e.g., in terms of an (x,y) coordinate identifying one corner of the box and width of height of the box) and an estimation of the head pose (e.g., in terms of yaw, pitch, and roll) are generated. A feature vector may be generated that characterizes those faces using any one or more metrics. For example, for each face, any one or more of distance between the corners of eyes, distance between the centers of eyes, nose width, depth of eye sockets, shape of cheekbones, shape of jaw line, shape of chin, hair color, and the presence and color of facial hair may be used as metrics. Once the feature vectors are generated for the faces, the Euclidean distance between vectors for different faces may be determined and used to assess face similarity.

Referring once again to the media server module 268, this uses a learning machine to process the bounding boxes to generate the feature vectors or signatures of the images of the objects captured in the video. The learning machine is for example a neural network such as a convolutional neural network (CNN) running on a graphics processing unit (GPU). The CNN may be trained using training datasets containing millions of pairs of similar and dissimilar images.

The CNN, for example, may be a Siamese network architecture trained with a contrastive loss function to train the neural networks.

The media server module 268 deploys a trained model in what is known as batch learning where all of the training is done before it is used in connection with video analytics. The trained model, in this embodiment, is a CNN learning model with one possible set of parameters. There is, practically speaking, an infinite number of possible sets of parameters for a given learning model. Optimization methods (such as stochastic gradient descent), and numerical gradient computation methods (such as backpropagation) may be used to find the set of parameters that minimize the objective function (also known as a loss function). A contrastive loss function may be used as the objective function. A contrastive loss function is defined such that it takes high values when it the current trained model is less accurate (assigns high distance to similar pairs, or low distance to dissimilar pairs), and low values when the current trained model is more accurate (assigns low distance to similar pairs, and high distance to dissimilar pairs). The training process is thus reduced to a minimization problem. The process of finding the most accurate model is the training process, the resulting model with the set of parameters is the trained model, and the set of parameters is not changed once it is deployed within the system running under normal operation.

In at least some alternative example embodiments, the media server module 268 may determine feature vectors by implementing a learning machine using what is known in the art as online machine learning algorithms. The media server module 268 deploys the learning machine with an initial set of parameters; however, the skilled in the art will understand that the parameters of the model may be updated subsequently over time based on some source of truth (for example, suitable user feedback). Such learning machines also include other types of neural networks as well as convolutional neural networks.

In accordance with at least some examples, storage of feature vectors within the comprehensive security system 200 is contemplated. For instance, feature vectors may be indexed and stored in the database 291 with respective video. The feature vectors may also be associated with reference coordinates to where extracted images of respective objects are located in respective video. Storing may include storing video with, for example, time stamps, camera identifications, metadata with the feature vectors and reference coordinates, etc.

Still with reference to FIG. 1, illustrated door systems 20A-20F may communicate with the respective access controllers 100 using wired and/or wireless secure communications. Thus, the door systems 20A-20F are communicatively linked to the server system 208 through the access controllers 100. Also, the one or more databases 291 can include a credential and policy directory of any suitable type known to those skilled in the art.

FIG. 1 shows each door system pair in communication with a separate access controller 100. However, other combinations of controllers 100 and door systems 20 may be implemented within the comprehensive security system 200. For example, a single controller 100 may control all door systems 20 for respective enclosed area(s), or even in the case of more door systems than illustrated, provided the controller supports the increased number. Also, the controller 100 is not necessarily limited to controlling door systems only for a respective single room or single building. In some examples, one controller 100 may control the door systems located within more than a single building.

As will be understood by those skilled in the art, each of the access controllers 100 may log events, and the logs may be configured via an interface provided by the UI module 255 of the access control application 253 to establish any number of devices, services, and systems as event recipients. The access controller 100 may send the events to a remote monitoring service in any number of formats including, for example, SNMP, XML via direct socket connection (GSM, LAN, WAN, WiFi™), Syslog, and through a serial port. As will be understood by one skilled in the art, the computer terminal 193 can receive event data from the access controllers 100 (for the purposes of event monitoring, for example). The door system 20 may send event signals to the computer terminal 193 by way of the access controller 100. Such signals include door open, door closed, locking mechanism locked, and locking mechanism unlocked. As noted above, the signals may originate from, for example, limit switches in the door system 20.

With respect to the door systems 20A-20F, each door system 20 typically includes an access door, a door controller and locking mechanism, and a credential reader. The door of the door system 20 may be any door that allows individuals to enter or leave an associated enclosed area.

Still with reference to FIG. 1, comprehensive security system 200 also includes nodes 298 (such as, for example, wireless routers) communicatively coupled to the server system 208. As will be appreciated by those skilled in the art, the nodes 298 communicatively link other devices, within wireless communication of the nodes 298, to the server system 208. In the illustrated example embodiment, these other devices include smart badges $300_1$ to $300_W$ each attached to a respective one of people $302_1$ to $302_W$. The smart badges $300_1$ to $300_W$ are explained in more detail below.

Figure 2:
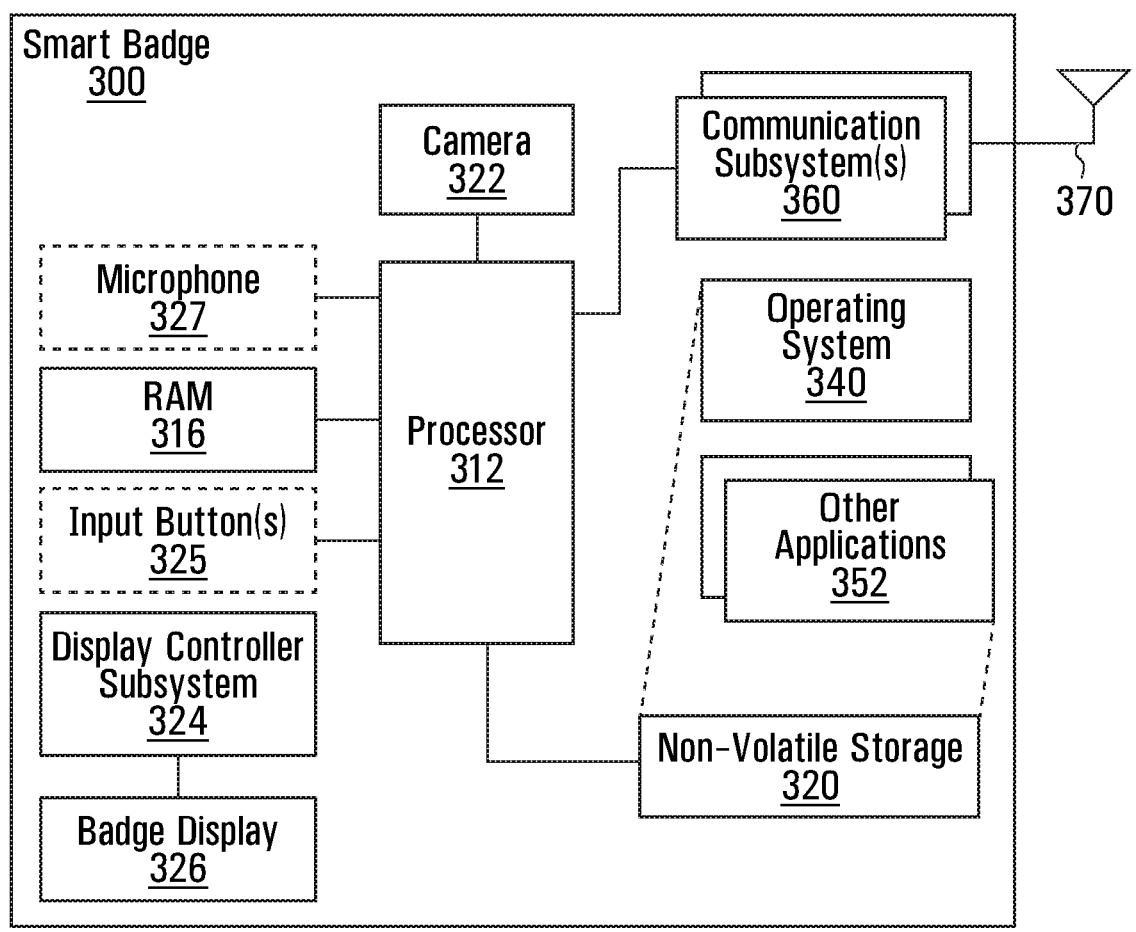
FIG. 2 is a block diagram of a smart badge, in accordance with an example embodiment, and employable within the security system of FIG. 1.

Reference is now made to FIG. 2 which shows a block diagram showing more details of the smart badge 300 that can be employed within the comprehensive security system 200. In accordance with some example embodiments, the smart badge 300 includes a flat, badge-like housing that can be attached and worn by a person (for example, in the torso region of a person). In the illustrated example embodiment, the smart badge is rectangular shaped; however other shapes are contemplated such as, for instance, star-shaped, circular/oval shaped, etc.

As illustrated in FIG. 2, the smart badge 300 includes at least one processor 312 that controls the overall operation of the smart badge 300. The processor 312 interacts with various subsystems such as, for example, random access memory (RAM) 316, non-volatile storage 320, camera 322, display controller subsystem 324, optional input buttons 325 and other subsystems that are not shown. The display controller subsystem 324 interacts with badge display 326 and it renders graphics and/or text upon the badge display 326.

Still with reference to the smart badge 300, operating system 340 and various software applications used by the processor 312 are stored in the non-volatile storage 320. The non-volatile storage 320 is, for example, one or more hard disks, solid state drives, or some other suitable form of computer readable medium that retains recorded information after the smart badge 300 is turned off (or enters into a power mode where no power is being delivered to memory/storage). Regarding the operating system 340, this includes software that manages computer hardware and software resources of the smart badge 300 and provides common services for computer programs. Also, those skilled in the art will appreciate that the operating system 340 and other applications 352, or parts thereof, may be temporarily loaded into a volatile store such as the RAM 316. The processor 312, in addition to its operating system functions, can enable execution of the various software applications on the smart badge 300.

Still with reference to FIG. 2, the smart badge 300 also includes one or more communications subsystem(s) 360 (for example, a cellular communication subsystem and/or a short-range communications subsystem of a conventional type or types). Communication functions, including data and voice communications, are performed through the communications subsystem(s) 360. Each of the communications subsystem(s) 360 is capable of receiving and transmitting, in respect of their communication functions, via the antenna(s) 370. Where the communications subsystem(s) 360 includes a cellular communication subsystem, the specific design and implementation will be dependent upon the communication network in which the smart badge 300 is intended to operate. For example, a cellular communication subsystem provided within the smart badge 300 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. As will be understood by one skilled in the art, the radio technologies that can be used by the cellular communication subsystem include a 4th generation mobile communications technology (4G), or may be a currently studied 5G mobile communications technology (5G) or even another mobile communications technology that is to be studied subsequently. The 4G Long-Term Evolution (LTE) standard, the 5G LTE standard, and other standards are contemplated. Also, other types of data and voice networks, both separate and integrated, may be utilized with the smart badge 300.

A cellular communication subsystem provided within the smart badge 300 can process a received signal, such as a text message, picture or video stream, for input to the processor 312. The received signal may then be further processed by the processor 312 for output to the badge display 326, for example. The smart badge 300 may optionally include one or more input buttons 325 to allow a user to provide input to the smart badge 300 such as, for example, instruct to change a mode of operation, provide a passcode, etc. The smart badge 300 may also optionally include a microphone 327 (in alternative to or in combination with the input buttons 325) to allow a user to provide input to the smart badge 300 such as, for example, instruct to change a mode of operation, provide a passcode, etc. Where appropriate, the input as received by the input buttons 325 and/or the microphone 327 may be transmitted via antenna 370 over a wireless network.

A short-range communications subsystem provided within the smart badge 300 enables communication between the smart badge 300 and other proximate systems or devices. For example, a short-range communications subsystem may include a Bluetooth™ communication module to provide for communication with similarly-enabled systems and devices. As another example, a short-range communications subsystem may include a Wi-Fi™ communication module to provide for communication with similarly-enabled systems and devices. As already mentioned, the smart badge 300 may generate data to be wireless transmitted to another device (for example, the server system 208, a proximate card read in one of the door systems 20A-20F, etc.) within the comprehensive security system 200. Different types of wireless transmission are contemplated (for example, transmission over a wireless carrier network, transmission over a wireless local area network, etc.). Also, those skilled in the art will appreciate that the smart badge 300 may obtain Global Positioning System (GPS) information and data through the communication subsystem(s) 360 and/or a separate GPS receiver.

Figure 3:
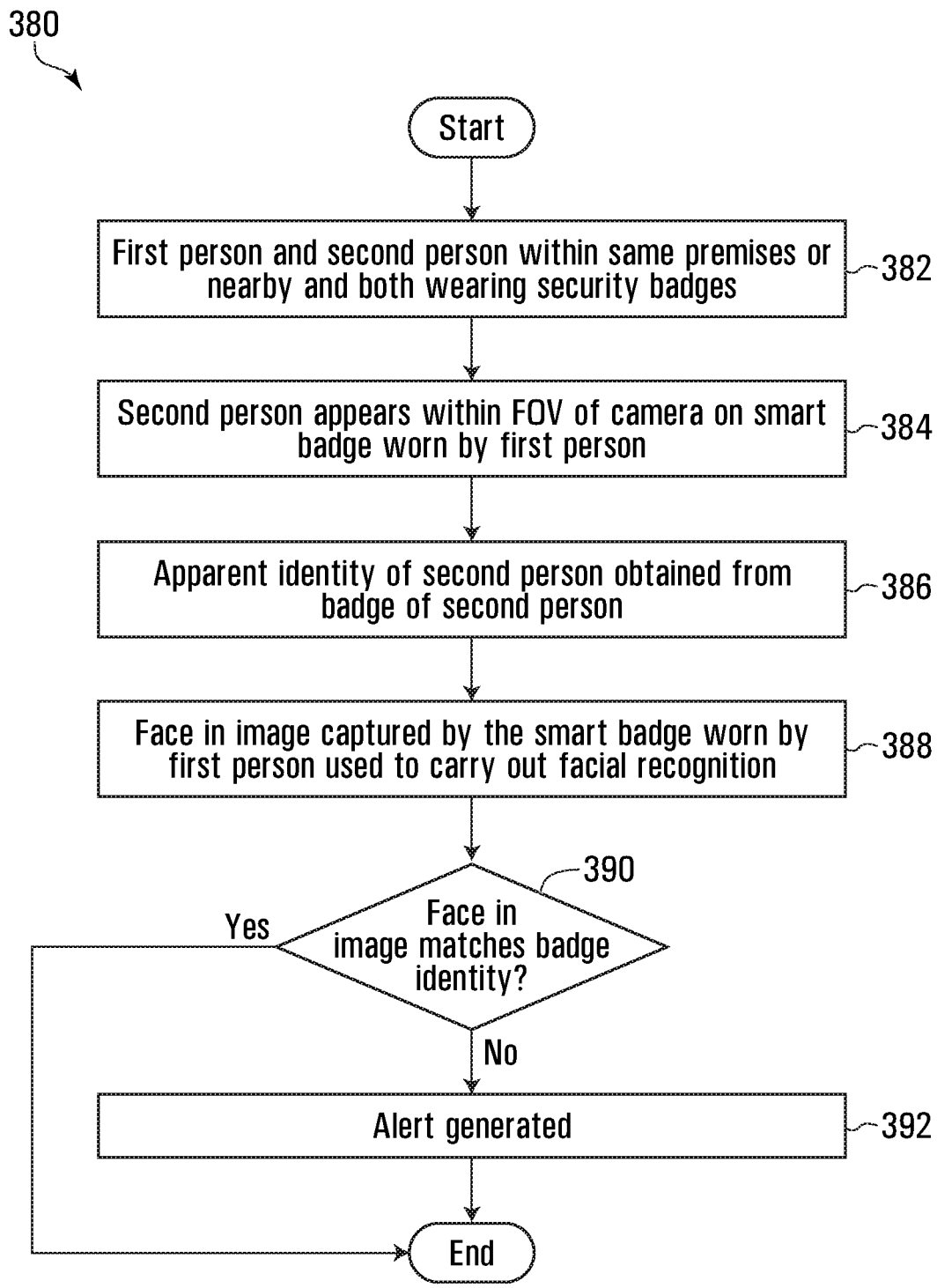
FIG. 3 is a flow chart illustrating a method, in accordance with an example embodiment, for checking whether an identity of a facial image, taken of a person wearing a badge, matches a correct identity of a specific person assigned to that badge.
Figure 4:
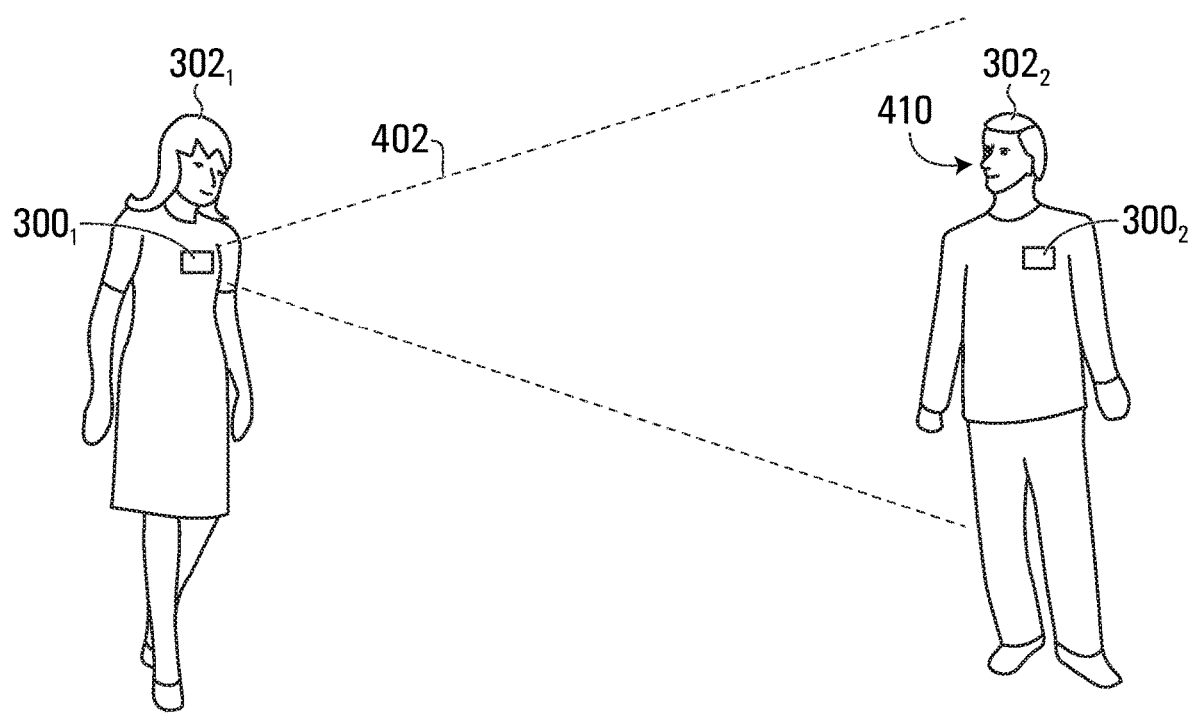
FIG. 4 is a diagram providing further example detail in relation to the example embodiment of FIG. 3.

Reference is now made to FIG. 3. FIG. 3 is a flow chart illustrating a method 380 for checking whether an identity of a facial image, taken of a person wearing a badge, matches a correct identity of a specific person assigned to that badge. Initially (i.e. at flow chart box 382 of the method 380) two people are i) both wearing security badges; and ii) both situated within a same premises and/or are nearby each other. For example, first and second people $302_1$ and $302_2$ (FIG. 4) are nearby each other and are wearing smart badges $300_1$ and $300_2$ respectively. Next in the method 380, the second person appears (384) within the Field Of View (FOV) of the camera on the smart badge worn by the first person. For example, in FIG. 4 the person $302_2$ enters the FOV of the smart badge $300_1$.

Next, the apparent identity of the second person is obtained (386) from the badge of the second person. For example, identity information stored on or otherwise available to be obtained from the smart badge $300_2$ is obtained, by the smart badge $300_1$, in some suitable manner. For instance, video analytics can be carried out on images captured by a camera within the smart badge $300_1$: first, object detection and classification algorithms can be applied to detect that the person $302_2$ is wearing a badge (i.e. the smart badge $300_2$). Next, identity information can be obtained from the detected badge. It will be understood that how this identity information is obtained will vary as between different example embodiments. In one example embodiment, the identity information is obtained via Bluetooth™ communications between the smart badges $300_1$ and $300_2$ (including, for example, the use of Bluetooth Low Energy beacons). In another example embodiment, video analytics is performed on something displayed on the worn badge itself (such as, for instance, detection and analysis of a QR code). For this latter example embodiment, contemplated video analytics may include cascade classifiers, object detection and classification networks (such as, for instance, You-Only-Look-Once) employed in a suitable manner as will be understood by one skilled in the art. Also, it is contemplated that video analytics on a badge is not limited to QR codes, and that video analytics on other aspects of a badge is possible including, for example, video analytics carried out on a badge photo, optical character recognition on a name appearing thereon, color or image analysis, etc.

Next in the method 380, facial recognition is carried out (388) on an image (face shown therein) captured by the smart badge worn by the first person. For example, an image captured by the smart badge $300_1$ includes face 410 of the person $302_2$, wherein the pixel-details of the face 410 are of sufficient quality to perform facial recognition.

Next (at decision shape 390) the apparent identity of the second person (as per the flow chart box 386) is compared against the identity result from the facial recognition (as per the flow chart box 388). In accordance with the illustrated example embodiment, an alert is generated (392) only if there is no match.

Variations in respect of the illustrated method 380 are contemplated. For example, in addition to detection and notification with respect to a badge being apparently worn by the incorrect person, detection and notification with respect to a badge being absent in relation to a person who should be wearing a badge is contemplated. As will be understood by one skilled in the art, video analytics can enable such detection and notification.

Figure 5:
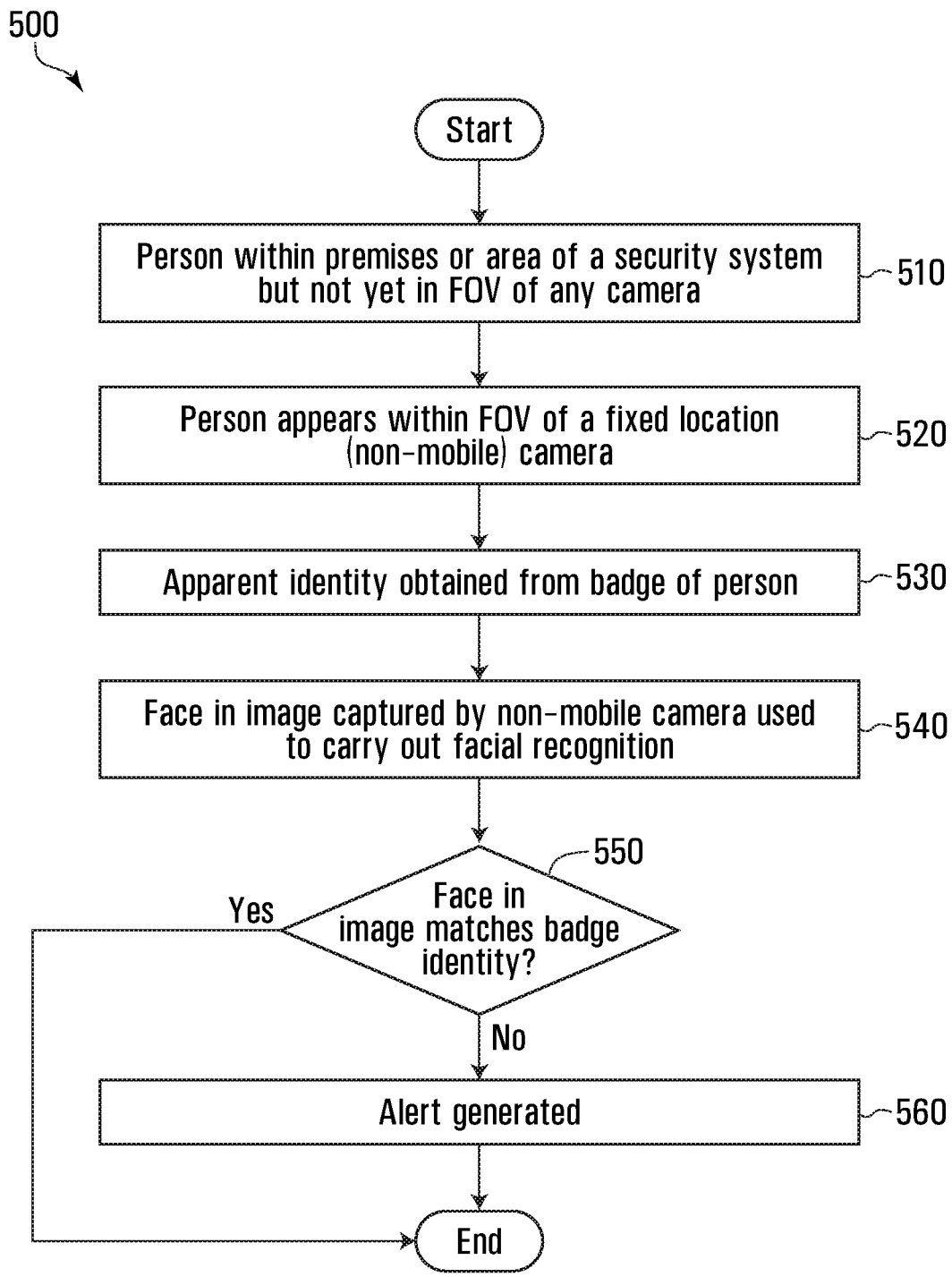
FIG. 5 is a flow chart illustrating a method, in accordance with an alternative example embodiment, for checking whether an identity of a facial image, taken of a person wearing a badge, matches a correct identity of a specific person assigned to that badge.
Figure 6:
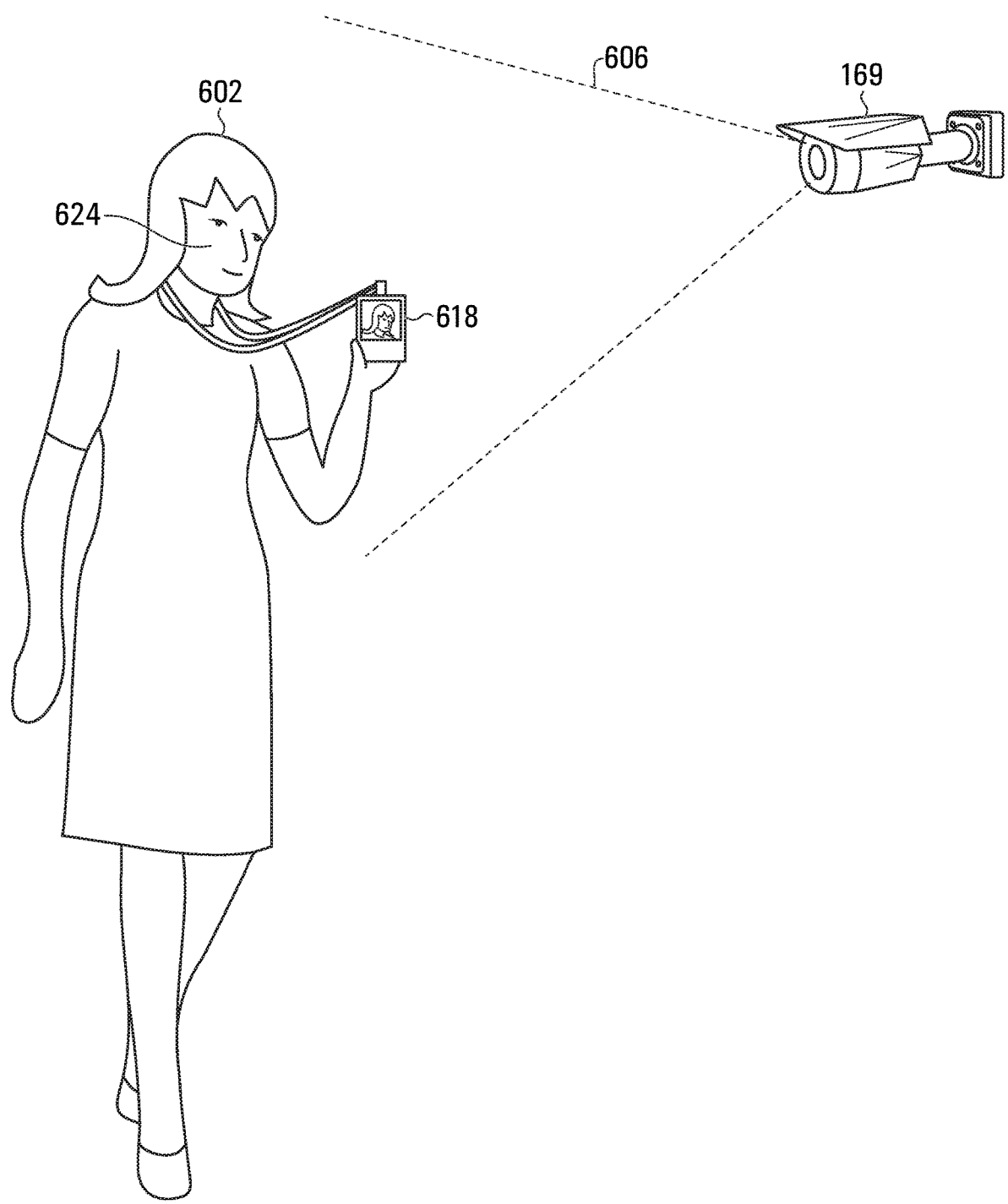
FIG. 6 is a diagram providing further example detail in relation to the example embodiment of FIG. 5

Reference is now made to FIG. 5. FIG. 5 is a flow chart illustrating an alternative method 500 for checking whether an identity of a facial image, taken of a person wearing a badge, matches a correct identity of a specific person assigned to that badge. Initially (i.e. at flow chart box 510 of the method 500) a person is within a premises or area of a security system (for example, the comprehensive security system 200) but not yet within the FOV of any camera. Next in the method 500, the person appears (520) within the FOV of a fixed-location (non-mobile) camera. For example, in FIG. 4 person 602 enters FOV 606 of the camera 169.

Next, the apparent identity of the person is obtained (530) from badge of the person. For instance, video analytics can be carried out on images captured by the camera 169: first, object detection and classification algorithms can be applied to detect that the person 602 is wearing a badge (i.e. badge 618, which may be either a smart badge or, alternatively, a non-electronic badge). Next, identity information can be obtained from the detected badge. It will be understood that how this identity information is obtained will vary as between different example embodiments. In one example embodiment, the identity information is obtained via Bluetooth™ communications between the badge 618 and the camera 169 (including, for example, the use of Bluetooth Low Energy beacons). In another example embodiment, video analytics is performed on something displayed on the worn badge itself (such as, for instance, detection and analysis of a QR code). For this latter example embodiment, contemplated video analytics may include cascade classifiers, object detection and classification networks (such as, for instance, You-Only-Look-Once) employed in a suitable manner as will be understood by one skilled in the art. Also, it is contemplated that video analytics on a badge is not limited to QR codes, and that video analytics on other aspects of a badge is possible including, for example, video analytics carried out on a badge photo, optical character recognition on a name appearing thereon, color or image analysis, etc.

Next in the method 500, facial recognition is carried out (540) on an image (face shown therein) captured by the non-mobile camera. For example, an image captured by the camera 169 includes face 624 of the person 602, wherein the pixel-details of the face 624 are of sufficient quality to perform facial recognition.

Next (at decision shape 550) the apparent identity of the second person (as per the flow chart box 530) is compared against the identity result from the facial recognition (as per the flow chart box 540). In accordance with the illustrated example embodiment, an alert is generated (560) only if there is no match.

Variations in respect of the illustrated method 500 are contemplated. For example, in addition to detection and notification with respect to a badge being apparently worn by the incorrect person, detection and notification with respect to a badge being absent in relation to a person who should be wearing a badge is contemplated. As will be understood by one skilled in the art, video analytics can enable such detection and notification.

In the foregoing specification, specific embodiments have been described. However, one of ordinary skill in the art appreciates that various modifications and changes can be made without departing from the scope of the invention as set forth in the claims below. For example, badge appearance and graphics/text thereon need not necessarily be static. It is contemplated that the displayed QR codes, colors, etc. may vary at regular or irregular intervals, and that this change over time may function to provide enhanced security against badge forging and copying.

Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object-oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method carried out within a security system, the method comprising:
    capturing, using a camera, an image of a person, the captured image including a face of the person within a first pixel region of the image;
    performing facial recognition on the first pixel region, contemporaneously with the person appearing within a field of view of the camera, to determine an identity of the person;
    performing video analytics, contemporaneously with the person appearing within the field of view of the camera and on a second pixel region of the image, different than the first pixel region, and the performing of the video analytics to:
        make a first determination that the identified person is wearing a badge, or
        make a second determination that no badge is being properly worn by the identified person; and
    generating an alert, specific to the identified person, within the security system based at least in part on the first or second determination, and
    wherein the camera is contained in a smart badge or provided at a fixed position outside of and separated from the badge.

2. The method as claimed in claim 1, wherein the performing of the video analytics includes performing a recognition algorithm on the badge to obtain an apparent identity of the person.

3. The method as claimed in claim 2, wherein the recognition algorithm includes optical character recognition carried out on a name displayed on the badge.

4. The method as claimed in claim 2, wherein the performing of the recognition algorithm includes analysis of a badge photo displayed on the badge.

5. The method as claimed in claim 1, wherein the second pixel region includes at least a substantial portion of a torso of the person.

6. A security system comprising:
    a camera contained in a smart badge or provided at a fixed position outside of and separated from the badge, and the camera being configured to capture an image of a person, the captured image including a face of the person within a first pixel region of the image; and
    at least one tangible, non-transitory, computer-readable storage medium having instructions encoded therein, wherein the instructions, when executed by at least one processor, cause a carrying out of a method comprising:
        performing facial recognition on the first pixel region, contemporaneously with the person appearing within a field of view of the camera, to determine an identity of the person;
        performing video analytics, contemporaneously with the person appearing within the field of view of the camera and on a second pixel region of the image, different than the first pixel region, the performing of the video analytics to:
            make a first determination that the identified person is wearing a badge, or make a second determination that no badge is being properly worn by the identified person; and generating an alert, specific to the identified person, within the security system based at least in part on the first or second determination.

7. The security system as claimed in claim 6, further comprising a server communicatively coupled to the camera.

8. The security system as claimed in claim 7, further comprising a plurality of smart badges communicatively coupled to the server.

9. The security system as claimed in claim 8, wherein each of the smart badges includes a respective embedded camera.

10. The security system as claimed in claim 6, wherein the performing of the video analytics includes performing a recognition algorithm on the badge to obtain an apparent identity of the person.

11. The security system as claimed in claim 10, wherein the recognition algorithm includes optical character recognition carried out on a name displayed on the badge.

12. The security system as claimed in claim 10, wherein the performing of the recognition algorithm includes analysis of a badge photo displayed on the badge.

13. The security system as claimed in claim 6, wherein the second pixel region includes at least a substantial portion of a torso of the person.

14. A security system comprising:

a camera contained in a smart badge or provided at a fixed position outside of and separated from the badge, and the camera being configured to capture an image of a person, the captured image including a face of the person within a first pixel region of the image; and at least one tangible, non-transitory, computer-readable storage medium having instructions encoded therein, wherein the instructions, when executed by at least one processor, cause a carrying out of a method comprising:

performing facial recognition on the first pixel region to determine an identity of the person;

performing video analytics on a second pixel region of the image, different than the first pixel region, the performing of the video analytics to:

make a first determination that the identified person is wearing a badge, or make a second determination that no badge is being properly worn by the identified person; and generating an alert, specific to the identified person, within the security system based at least in part on the first or second determination, and wherein the performing of the video analytics includes performing a recognition algorithm on the badge to obtain an apparent identity of the person.

15. The security system as claimed in claim 14, further comprising a server communicatively coupled to the camera.

16. The security system as claimed in claim 15, further comprising a plurality of smart badges communicatively coupled to the server.

17. The security system as claimed in claim 16, wherein each of the smart badges includes a respective embedded camera.

18. The security system as claimed in claim 14, wherein the recognition algorithm includes optical character recognition carried out on a name displayed on the badge.

19. The security system as claimed in claim 14, wherein the performing of the recognition algorithm includes analysis of a badge photo displayed on the badge.

20. The security system as claimed in claim 14, wherein the second pixel region includes at least a substantial portion of a torso of the person.

* * * * *